United States Patent [19]

Penneck et al.

[11] Patent Number: 4,794,295
[45] Date of Patent: Dec. 27, 1988

[54] ACOUSTIC TRANSDUCER

[76] Inventors: Richard J. Penneck, "Treeve", Westway, Lechlade, Gloucestershire; Peter N. Barnett, 50 Tismeads Crescent, Swindon, Wiltshire; David R. Fox, 48 Berton Close, Broad Blunsdon, Swindon, Wiltshire; Michael C. Booth, 135 Marlborough Road, Swindon, Wiltshire; Edward B. Atkinson, Hyams Lane, Holbrook, Ipswich, Suffolk, all of England

[21] Appl. No.: 938,293

[22] Filed: Dec. 5, 1986

[30] Foreign Application Priority Data

Dec. 5, 1985 [GB] United Kingdom ............... 8529976

[51] Int. Cl.$^4$ .............................................. H01L 41/08
[52] U.S. Cl. .................................. 310/330; 310/338; 310/367; 310/800
[58] Field of Search ............... 310/330-332, 310/338, 367, 369, 800

[56] References Cited

U.S. PATENT DOCUMENTS

| | | | |
|---|---|---|---|
| 3,750,127 | 7/1973 | Ayers et al. | 310/800 X |
| 3,798,474 | 3/1974 | Cassand et al. | 310/800 X |
| 3,862,477 | 1/1975 | Ayers et al. | 310/800 X |
| 4,183,010 | 1/1980 | Miller | 310/800 X |
| 4,300,219 | 11/1981 | Joyal | 367/174 |
| 4,322,877 | 4/1982 | Taylor | 29/25.35 |
| 4,369,391 | 1/1983 | Micheron | 310/800 |
| 4,509,947 | 4/1985 | Lattin | 310/800 X |
| 4,568,851 | 4/1986 | Soni et al. | 310/800 |
| 4,638,207 | 1/1987 | Radice | 310/800 X |

FOREIGN PATENT DOCUMENTS 2606621 5/1977 Fed. Rep. of Germany .

OTHER PUBLICATIONS

Pantelis, ACS Symposium Series 242, 399 (1984).

Primary Examiner—Mark O. Budd
Attorney, Agent, or Firm—Kinney & Lange

[57] ABSTRACT

A pressure sensing transducer comprises a central region which comprises a potting material and which is surrounded by a helix of piezo electric coaxial cable. The transducer includes a barrier that suppresses transmission of external pressure variations to the central region. In addition, the overall radial stiffness of the potting material and barrier is sufficiently low that the electrical signal generated by the coaxial cable have a $d_{31}$ polarity (corresponding to axial stretching and contracting of the cable).

25 Claims, 2 Drawing Sheets

ACOUSTIC TRANSDUCER

This invention relates to pressure transducers and especially to acoustic transducers.

It has been proposed to form transducers for detecting very low amplitude pressure variations out of piezoelectric materials, and recently from piezoelectric polymeric materials, for example as described in U.S. Pat. No. 3,798,474. The use of piezoelectric polymeric materials has a number of advantages over the use of piezoceramics, for example long piezoelectric elements can be formed which provide a large area for receiving acoustic signals. In addition, polymeric piezoelectric devices are inherently more flexible than piezoceramic devices, the increase in flexibility providing a number of benefits including reduced risk of catastrophic failure when subjected to excessive pressures. The use of various piezoelectric elements and suggestions for transducer geometries are also described by Powers, IEEE Electronics and Aerospace Convention 1979 Part III, and by Pantellis, Physics in Technology 15(5) September 1984 pp. 239-243 and 261, and American Chemical Society Symposium Series 1984 pp. 399 et seq., the disclosures of which are incorporated herein by reference. However, it has been appreciated that considerable improvements in the sensitivity of such piezoelectric devices are necessary in order for effective transducers to be formed.

The signals produced by a piezoelectric material depend inter alia on the direction in which the strain is applied, as is made clear for example by Klaase and Van Turnhout IEE Conf Publ No. 177, 1979 and Nix, Holt, McGrath and Ward, Ferroelectrics 1981 vol 32 p.p. 103-114. Where the material has been oriented by stretching and polarized by application of a high electric field perpendicular to the direction of orientation, the $d_{31}$ response of the material is the charge generated in the direction of poling by stress applied in the orientation direction, the $d_{33}$ response is the charge generated by stress applied in the poling direction, and the $d_{32}$ response is the charge generated by stress applied in a direction perpendicular to both the directions of orientation and poling. Typically the $d_{31}$ response of polyvinylidine fluoride is large, the $d_{33}$ is larger still (about 50% larger tha $d_{31}$) and of opposite sign and the $d_{32}$ is small and of the same sign as $d_{31}$. The signal obtained when a material is subjected to a hydrostatic stress in which pressure is applied equally in all directions, usually referred to as $d_{3h}$, is simply the sum of the $d_{31}$, $d_{32}$ and $D_{33}$ responses and will usually be relatively small, typically about 10 $pCN^{-1}$, since the $d_{31}$ response will counteract much of the $d_{33}$ response, and will be of the same sign as the $d_{33}$ response since the $d_{33}$ response is the largest component. Considerable work has been conducted to improve the response of piezoelectric materials, for example as described in the Nix et al paper mentioned above, and the sensitivity of the materials is usually defined in terms of the hydrostatic piezoelectric cofficient $d_{3h}$, an improvement in which implies that $d_{33}$ increases at a greater rate than $d_{31}$ (or $d_{32}$). In the case of coaxial cables, in which the piezoelectric material has been stretched axially and poled radially, the provision of a central metal conductor will improve the $d_{3h}$ coefficient of the cable further in the majority of cases since it will usually suppress axial elongation and contraction of the cable and thereby reduce the $d_{31}$ contribution to the $d_{3h}$ coefficient.

The present invention provides a pressure sensing transducer which comprises a central region around which is formed a helix of piezoelectric coaxial cable that will generate electric signals in response to external pressure variations, the central region having a sufficiently low radial stiffness to allow radial contraction of the helix in response to external pressure variations such that the electrical signals generated by the coaxial cable have a $d_{31}$ polarity.

By the term "$d_{31}$ polarity" as used herein is meant that the signals generated by the cable have the sign characteristic of $d_{31}$ signals, i.e. of those produced by stress applied in the "1" (stretching) direction. This does not means that the signals produced are pure $d_{31}$ signals, since the transducer signal will normally contain $d_{32}$ and $d_{33}$ components in addition, but that the $d_{31}$ signal is enhanced and/or the $d_{33}$ signals are reduced by the transducer according to the invention to give a signal of $d_{31}$ polarity. In the field of transducer design it is often more usual to refer to the voltage piezoelectric coefficient, $g_{31}$, $g_{32}$, $g_{33}$ and $g_{3h}$. However, since the voltage piezoelectric coefficient $g_{3i}$ will be proportional to the charge piezoelectric coefficient $d_{3i}$, the polarity of the signals produced will be the same whether expressed in terms of a charge or a voltage coefficient.

The piezoelectric coaxial cable is preferably one that includes a polmeric piezoelectric dielectric layer, for example a dielectric layer formed from nylon 5, nylon 7 or other odd numbered nylons, polyhydroxybutyrate, vinylidine cyanide/ vinyl acetate copolymers and vinylidine fluoride polymers. The preferred polymers are the vinylidine fluoride polymers, e.g. copolymers of vinylidine fluoride with vinyl fluoride, trifluoroethylene, tetrafluoroethylene, vinyl chloride and chlorotrifluoroethylene, or polyvinylidine fluoride. Preferably also, the cable is one in which the central conductor has an axial modulus that is less tha that of the polymeric dielectric, so that the $d_{31}$ response of the coaxial cable is not suppressed. Examples of coaxial cables that are particularly suitable for use in the present invention are given in our co-pending British Patent Application No. 2,150,345A, the disclosure of which is incorporated herein by reference.

It should be noted that the terms "axial" and "radial" when used herein with reference to the coaxial cable refer to the axial and radial directions of the cable itself while the same terms when used in connection with the helix, the central region or element of the transducer other than the coaxial cable, refer to the axis and radius of the helix and not the coaxial cable.

Not only is it possible to form transducers according to the present invention that have a relatively high sensitivity and are also long and flexible, but also the transducers have a relatively high capacitance and can exhibit a substantially uniform directional response throughout 360° around their axis.

In order to provide improved sensitivity, the transducer preferably includes a barrier (which may be formed at least partly by the coaxial cable) around the central region that suppreses transmission of external pressure variations to the central region or suppresses radial flow of any potting material in the central region in response to such pressure variations, that is to say, the amplitude of the pressure variations will normally be smaller in the central region than outside the helix. The barrier may be formed at least partly by the coaxial cable or may be in contact with the cable so that radial expansion and contraction of the barrier in response to the pressure variations stretches or contracts the coaxial cable along its axis with proportionately less stress being exerted radially on the cable as compared with the cable used in the $d_{3h}$ mode. It is possible for the barrier to be formed entirely from the coaxial cable, in which case the helix will need to be close wound, i.e. with adjacent windings in contact with the one another. Alternatively the coaxial cable may be "close wound" with one or more spacer strands to form a two or more art helix, in which case the coaxial cable and the or each spacer strands together form the barrier. However, it is preferred for the helix to have an open winding for reasons given below, in which case the barrier will include one or more other elements. If any other materials are used to form the barrier, it may be desirable for the radial stiffness of the barrier to be provided at least partly by the coaxial cable, for example at least 20% and more preferably at least 30% of the radial stiffness to be provided by the coaxial cable, and, in some cases for the coaxial cable to provide a contribution to the radial stiffness of the barrier that is equal to, or even higher than that of the other components. Alternatively or in addition each other material forming the barrier may have a tensile (Young's) modulus in the direction of the circumference of the helix, that is lower than that of the coaxial cable dielectric. The barrier may have any of a number of different constructions, and may be formed from a number of different layers although it is preferred that the different parts of the barrier, including the coaxial cable, move together in reponse to the pressure variations since if they move independently the sensitivity of the transducer may be reduced.

In one form of transducer according to the present invention the helix is enclosed within a flexible hollow tube which preferably forms part of the barrier. Preferably, the tube was dimensionally recovered about the helix from a previous configuration of larger diameter, especially by the application of heat.

Heat-recoverable articles usually recover, on heating, towards an original shape from which they have previously been deformed but the term "heat-recoverable", as used herein, also includes an article which, on heating adopts a new configuration, even if it has not been previously deformed. In their most common form, such articles comprise a heat-shrinkable sleeve made from a polymeric material exhibiting the property or elastic or plastic memory as described, for example, in U.S. Pat. Nos. 2,027,962; 3,086,242 and 3,597,372.

Any polymeric material to which the property of dimensional recoverability may be imparted may, in theory, be used to form the table. Polymers which may be used include polyolefins such as polyethylene and ethylene copolymers for example with propylene, butene, vinyl acetate or ethyl acrylate, polyamides, polyurethanes, polyvinyl chloride, polyvinylidine fluoride, elastomeric materials such as those described in U.K. specification No. 1,010,064 and blends such as those described in U.K. specification Nos. 1,284,082 and 1,294,665, the disclosures of which are incorporated herein by reference. Care should be taken, however, to ensure that the heat used for recovering the tube about the helix of coaxial cable does not adversely affect the piezoelectric properties of the cable, and for this reason, if a polymeric piezoelectric cable is used, polymeric materials having a relatively low recovery temperature are preferred e.g. a recovery temperature of not more than 130° C. and especially not more than 100° C. Examples of preferred materials include ethylene/vinyl acetate and ethylene/ethyl acrylate copolymers. It is also possible to use dimensionally recoverable materials that recover other than by heat treatment for the tube. Thus, for example the tube may be formed from a solvent-shrinkable material and may be recovered about the helix by application of the appropriate solvent or from a solvent swellable material that is recovered by evaporation of the solvent. The tube will usually have a wall thickness in the range of from 0.1 to 1 mm.

In another form of transducer the helix may be located around, or even in the wall of, a hollow, radially compressible support member which also forms part of the barrier. The flexible support member is preferably formed from a plastics material and having one or more helical grooves or depressions for correctly locating the coaxial cable. The material from which the support member is formed preferably has a tensile modulus in the direction of the circumference of the helix that is of the same order of magnitude as the tensile modulus of the dielectric, and most preferably has a modulus of at least one quarter, and especially at least half, that of the dielectric. The circumferential modulus of the support member can, in some instances, even be higher than the axial modulus of the cable dielectric provided that the overall radial stiffness of the support member and the central region is low enough to allow contraction and expansion of the coaxial cable helix. Preferred materials from which the support member may be formed include thermoplastics e.g. polyvinylidine fluoride, poly(ethylenetetrafluoroethylene) polyolefins e.g high or medium density polyethylene or polypropylene, polyamides e.g. nylon 6, nylon 6,6, nylon 6,10 or nylon 11, and engineering plastics e.g. polyetherketones, polyether ether ketones or polyether sulphones. Alternatively, blends of thermoplastics and elastomers, and segmented block copolymers may be used. If desired, the support member may be formed from a metal, for example a metal e.g. copper or aluminium may be plated or electroformed onto a potting material. The support member may be formed in a number of ways, for example by moulding, e.g. by flow moulding, or by injection forming, or by recovering a dimensionally recoverable tube onto an appropriately shaped mandrel.

The coaxial cable may be bonded to the support member by a potting material, in which case the coaxial cable may be completely encapsulated within a relatively thick layer of the potting material or the potting material may be located only between the cable and the support member. Alternatively, the cable may be bonded to the support member by means of a flexible adhesive or potting material and the cable may be enclosed in a further flexible potting material which may exhibit high or low damping characteristics. The support member is described and claimed in our copending European and International patent applications entitled "Support Member for Pressure Sensor" filed on even date herewith (Agent's reference RK285), the disclosure of which is incorporated herein by reference.

In yet another form of transducer, the helix may be located on a hollow flexible support and, in addition, be enclosed in a hollow flexible tube.

It is possible for the central region of the transducer to be empty or to contain any ambient fluid for example water, kerosene or a silicone fluid.

An ambient fluid may be used to equilibrate the internal and external static pressure of the transducer. If, however, the central region of the transducer contains ambient fluid, the transducer construction preferably still maintains a dynamic pressure differential between the interior and exterior of the helix, that is to say, the ambient fluid is preferably not allowed to flow freely between the central region and the exterior of the barrier to the extent that it is able to transmit the pressure signals directly to the central region. This may be achieved by providing the transducer with end caps which allow the flow of ambient fluid therethrough but exert resistance on the flow of fluid. In the case of very long transducers, however, and especially if the transducer diameter is small, end caps may not be necessary since the flow of ambient fluid into the central region will only affect the end portions of the transducer, causing them to generate a $d_{3h}$ signal, while the (axial) central portion of the transducer will still generate a signal of $d_{31}$ polarity. In addition, care should be taken that the provision of the ambient fluid in the central region does not increase the radial stiffness of the central region to the extent that it unduly prevents radial expansion or contraction of the helix.

Preferably the central region of the transducer comprises a potting material. The potting material that may be used to fill the interior of the support member is preferably one that has a relatively low complex bulk modulus throughout the frequency range of up to 200 Hz and preferably up to 2000 Hz since the bulk modulus of the potting material may contribute significantly to the radial stiffness of the support. Examples of materials which can be used to form the potting material include polyurethane elastomers, silicone elastomers or natural rubber. Alternatively the potting material may comprise a liquid e.g. water, kerosene or a silicone fluid which is held in a flexible bag. It is also possible for the potting material to comprise a gel, for example a gel comprising a crosslinked elastomeric network (e.g. an organopolysiloxane or a polyurethane or a fluorosilicone) which has been extended to a high degree e.g. 70% or more of the gel, with a liquid e.g. a liquid organopolysiloxane. Such gels generally exhibit liquid like flow properties combined with high cohesive strength. In some instances it is possible for the potting material and the barrier to be formed from the same material, for example some forms of potting material may be crosslinked at their outer surface by irradiation or chemical crosslinking means to form an outer layer or skin of relatively high tensile modulus. The radial stiffness of the support may be expressed by the approximate equation:

$$\text{stiffness} = 2 \cdot K_p + \frac{E \cdot T}{R}$$

where
$K_p$ is the bulk modulus of the potting material,
E is the tensile modulus of the material forming the support member,
T is the wall thickness of the support member, and
R is the mean radius of the support member.

Advantageously the radial stiffness of the support, as defined above, is not more than 10, preferably not more than 6, more preferably not more than 4, especially not more than 3 and most especially not more than 2 GPa. Where foamed materials are incorporated in the potting material, the radial stiffness of the support may be reduced even further, e.g. to values of 1 or 0.5 GPa or even lower. Preferably the potting material has a bulk modulus of not more than 4000 MPa, more preferably not more than 3000 MPa and especially not more than 2000 MPa. For example, the silicone rubbers used in the formation of transducers described below generally exhibit a bulk modulus in the order of 2000 MPa. In some instances it may be desirable for the potting material to have an even lower bulk modulus, e.g. below 1000 MPa in which case it is possible to reduce the bulk modulus by foaming the potting material e.g. by agitation or by the use of blowing agents, or by incorporating a foamed material therein e.g. foamed high or low density polyethylene (preferably a closed cell foam) or expanded polystyrene. The bulk modulus of the potting material may be determined by the method described by B. P. Holownia in J. Inst. Rubber Industry August, 1974, 157-160. This method is not readily applicable to the measurement of the bulk modulus of foamed materials, in which case the modulus of the material may be obtained from the equation:

$$B^{-1} = Bo^{-1}(1 - kf)^{-1} + \frac{3kf}{4\mu(1 - kf)}$$

where:
B is the bulk modulus of the foamed material;
Bo is the bulk modulus of the unvoided material;
$\mu$ is the shear modulus of the unvoided material;
f is the fractional volume of the potting material occupied by voids; and
k is a packing fraction coefficient (taken to be 0.74).

This equation can be shown to correspond to the equation:

$$B^{-1} = Bo^{-1}(1 - kf)^{-1} + \frac{(1 - \nu)kf}{2Bo(1 - kf)(1 - 2\nu)}$$

where $\nu$ is Poisson's ratio.

A large variation in the modulus with respect to frequency and/or temperature is often found when the temperature of the material is close to the glass transition temperature of the material and it is therefore preferred for the material to have a glass transition temperature (at 100 Hz and preferably also at 2 KHz) that differs from the normal operating temperature of the transducer (about 0° to +15° C.) by at least 10° C., more preferably at least 15° C. and especially at least 20° C., the glass transition temperature preferably being below the normal operating temperature of the transducer.

In addition, it is preferred for the ratio $E.T/K_p.R$ (where E, T, $K_p$ and R are defined above) to be at least 0.02 in order for the support member to reduce the dynamic pressure variations in the potting material. Preferably the ratio is at least 0.03, although where potting materials of lower bulk modulus are used, e.g. foamed materials, the ratio may be as high as 1 or even higher. The thickness of the support member will normally be at least 0.005, preferably at least 0.01 and especially at least 0.02 times its radius, but normally not more than 0.2, preferably not more than 0.1 times its radius, in which case the material forming the support member preferably has a tensile modulus of at least 0.2, more preferably at least 0.5, especially at least 1.0 and most especially at least 1.5 times the bulk modulus of the potting materials, although it may have a tensile modulus that is more than twice or even four times the bulk modulus of the potting material where foamed or expanded potting materials are used. Typically the radial stiffness of the support member (without potting material), defined by the product E.T, will be less than 6 MPa.m, and usually less than 3 MPa.m.

We have found that the use of a foamed potting material not only can improve the sensitivity of the hydrophone but also can reduce the depth sensitivity of the hydrophone, that is to say, reduce the change in the response of the hydrophone as the hydrostatic pressure increases.

The transducer need not comprise only a single helix of coaxial cable, but may include two or more helices that may be spaced apart from one another or may be combined to form e.g. two start helix. For example, a particularly preferred form of transducer includes a pair of coaxial cables which have been oppositely polarised, the coaxial cables being connected to, or having terminals for connection to, a responsive electrical device such as a differential amplifier, so that the piezoelectric responses of the two coaxial cables are added but that any responses of the cables to other stimuli are at least partly cancelled.

Several forms of transducer in accordance with the present invention will not be described by way of example with reference to the accompanying drawings in which.

Figure 1:
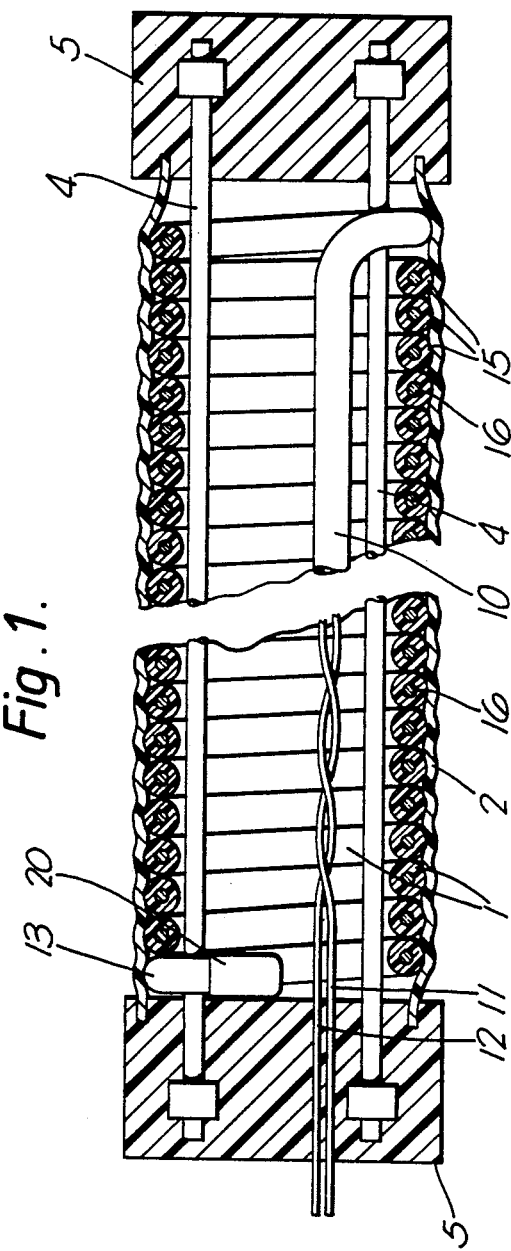
FIG. 1 is a schematic sectional elevation along the axis of a first form of transducer according to the invention.

Referring to the accompanying drawings, FIG. 1 shows part of an acoustic transducer comprising a piezoelectric coaxial cable 1 that has been wound into a helix and is retained within a hollow plastics tube 2. The interior 3 of the tube 2 is filled with a urethane polymer/elastomer potting material (not shown) of relatively low bulk modulus.

The transducer is formed by winding the coaxial cable 1 helically around a cylindrical mandrel, recovering a heat-shrinkable tube 2 formed from an ethylene/vinyl acetate copolymer onto the mandrel and cable helix, removing the mandrel, positioning a number of steel wire strength members 4 parallel to the axis of the tube 2, and filling the tube 2 with a potting material. The ends of the tube 2 are enclosed in a pair of stiff epoxy end-caps 5 formed in situ in which the ends of the strength members 4 are anchored. Before the interior of the helix is filled with the potting material and the end caps 5 are formed, one end portion 10 of the coaxial cable is connected to a twisted pair of primary wires 11 and 12 for example by means of a crimp connector (not shown) and the primary wires are led out of the opposite end of the helix and heat-recovered tube 2. The other end portion 13 of the coaxial cable may be lead out of the same end of the tube 3 as the primary wires 11 and 12 or be connected within the helix to a further pair of primary wires but is preferably simply terminated, for example as shown by enclosing it within a small insulating cap 20 formed e.g. from a heat-shrinkable polymer. After completion of the transducer, the primary wires 11 and 12 and the end portion 13 of the coaxial cable may be connected directly to a preamplifier.

The coaxial cable 1 is formed by co-extruding a polyvinylidine fluoride dielectric layer 15 and a low melting point metal central conductor 16 to form a wire, heating the wire, stretching the wire to a draw ratio of 3.5 to 4.5 to orient the polyvinylidine fluoride and simultaneously poling the polyvinylidine fluoride by means of a corona discharge, and then depositing a metal outer electrode and optionally providing the cable with a polymeric jacket, this procedure being described in our co-pending British Patent Application No. 2,150,345A.

The transducer preferably has an overall diameter of about 15 mm, and a length of from 0.1 to 2 m. As shown the pitch of the helic windings is set so that the adjacent windings of the cable touch, or almost touch one another. Alternatively the windings may be separated from one another by up to about 6 mm.

In use, when the transducer is submerged in water, acoustic vibrations will cause the tube 2 and the coaxial cable helix to expand and contract radially thereby stretching and contracting the coaxial cable 1 along its axis. However, because the pressure vibrations act radially on the cable 1 to a significantly smaller extent, the signal generated by the cable has a polarity corresponding to a $d_{31}$ mode.

Figure 2:
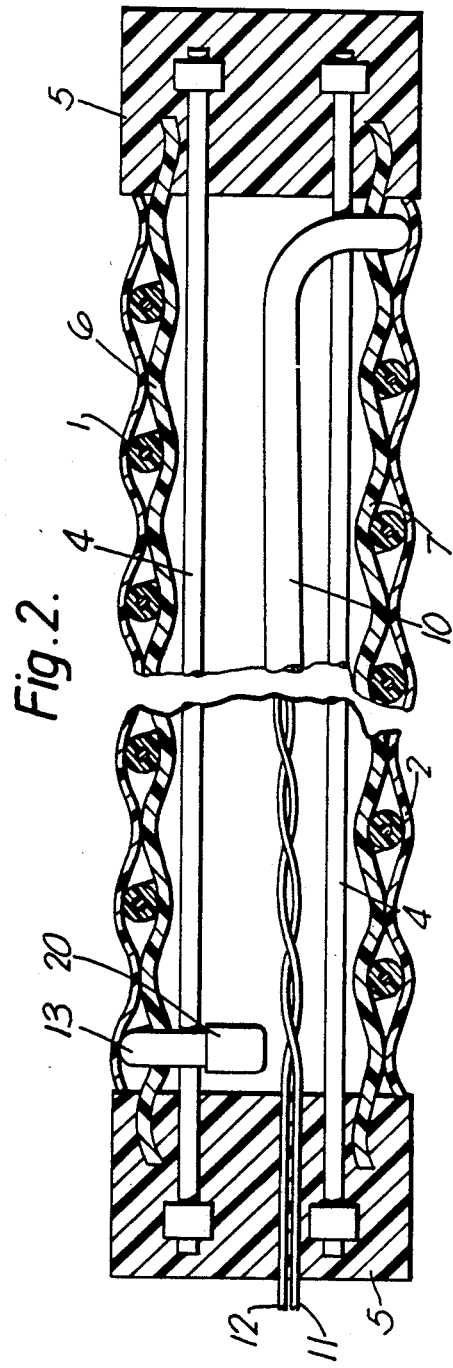
FIG. 2 is a schematic sectional elevation along the axis of a second form of transducer according to the invention.

FIG. 2 shows another form of transducer according to the invention in which the helix of coaxial cable has been formed by winding the cable around a flexible, hollow, generally cylindrical support member 6 instead of a mandrel, the support member then being left in place. The support member comprises a polyvinylidine fluoride tube that has previously been recovered onto an appropriately shaped mandrel to provide the tube with one or more helical grooves 7. The central region enclosed by the support member 6 also includes a number of steel wire axial strength members 4 that may be bonded to the support member 6 to provide axial strength without increasing its radial stiffness significantly. Before or after the coaxial cable has been wound around the support member 6 the interior of the support member is filled with a flexible, low bulk modulus, silicone potting material and the ends of the support member and the strength members are encased in a pair of stiff epoxy end-caps 5 as described with reference to FIG. 1. After the end-caps have been provided, a potting material is applied to the external surface of the support member so that the coaxial cable is embedded in potting material and bonded to the support member 6.

Figure 3:
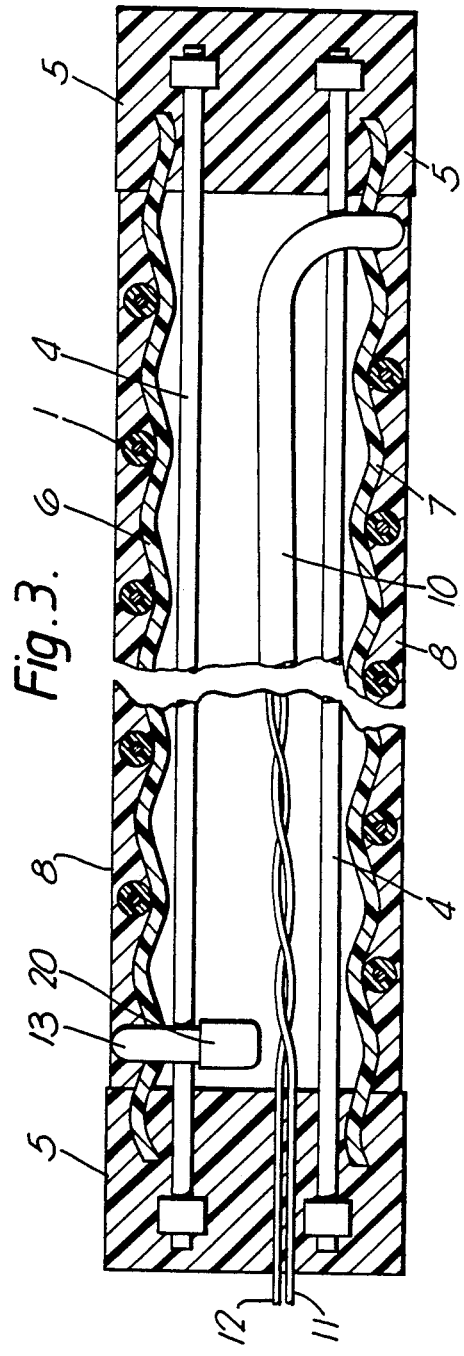
FIG. 3 is a schematic sectional elevation along the axis of a third form of transducer according to the invention.

Then the transducer may then be provided with an outer jacket 2 by recovering a radially recoverable tube thereon. Alternatively, and as shown in FIG. 3, the coaxial cable may be completely encased in a thick layer 7 of potting material, which obviates the necessity of a jacket 2.

The following Examples illustrate the invention:

EXAMPLE 1

An acoustic hydrophone of the type shown in FIG. 2 was formed using a 1.6 mm diameter piezoelectric cable as described in British Patent Application No. 2,150,345A, a 0.5 mm thick tube of polyvinylidine fluoride as the support member, and a cured silicone potting material based on a vinyl terminated silicone polymer of peak molecular weight about 25,000 and containing about 45% silica based filler. The coaxial cable helix had a 10 mm diameter and the transducer had an overall length of 230 mm.

The hydrophone sensitivity was tested in a water tank at frequencies between 600 Hz and 2 kHz. The results are shown in Table I.

TABLE I

| Frequency (kHz) | Sensitivity (dB re 1 V per micropascal) |
| --- | --- |
| 0.6 | −194.8 |
| 0.8 | −194.5 |
| 1.0 | −194.9 |
| 1.2 | −194.5 |
| 1.4 | −194.7 |
| 1.6 | −194.3 |
| 1.8 | −194.2 |
| 2.0 | −193.6 |

The hydrophone was also tested in a piston phone acoustic calibrator at frequencies between 20 and 160 Hz. The results show a good correlation with the tank measurements and are shown in Table II.

TABLE II

| Frequency Hz | Sensitivity (dB re 1 V per micropascal) |
| --- | --- |
| 20 | −194.3 |
| 40 | −194.2 |
| 60 | −194.3 |
| 80 | −194.3 |
| 100 | −194.1 |
| 120 | −194.2 |
| 140 | −194.2 |
| 160 | −193.7 |

It was found that the sensitivity of the device was about 12 dB higher than that of the freely suspended coaxial cable on its own working in the $d_{3h}$ mode.

EXAMPLE 2

An acoustic hydrophone as shown in FIG. 3 was formed using a 1.6 mm diameter piezoelectric cable was described in British Patent Application No. 2,150,345A, a 15 mm diameter tube of polyvinylidine fluoride of wall thickness 0.5 mm as the support member and the same silicone rubber potting material as was used in Example 1. The sensitivity was tested in a water tank at frequencies between 600 Hz and 2.0 kHz and the results are shown in Table III.

TABLE III

| Frequency kHz | Sensitivity (dB re 1 V per micropascal) |
| --- | --- |
| 0.6 | −190.5 |
| 0.8 | −190.4 |
| 1.0 | −190.6 |
| 1.2 | −190.2 |
| 1.4 | −190.2 |
| 1.6 | −190.2 |
| 1.8 | −190.2 |
| 2.0 | −190.2 |

EXAMPLE 3

Example 2 was repeated with the exception that the silicone potting material in the central region contained approximately 40% by volume of expanded polystyrene chips in order to reduce the bulk modulus of the potting material. The sensitivity of the transducer was tested in a water tank at frequencies between 400 Hz and 2 kHz, and the results are shown in Table IV.

TABLE IV

| Frequency kHz | Sensitivity (dB re 1 V per micropascal) |
| --- | --- |
| 0.4 | −187.3 |
| 0.6 | −187.4 |
| 0.8 | −187.2 |
| 1.0 | −186.6 |
| 1.2 | −186.4 |
| 1.4 | −186.6 |
| 1.6 | −186.6 |
| 1.8 | −186.2 |
| 2.0 | −186.3 |

EXAMPLES 4 TO 10

Example 1 was repeated using a support member that had been formed from polyvinylidine fluoride by a vacuum forming process, and had a minimum diameter of 11.5 mm and a minimum wall thickness of 0.21 mm. The following potting materials were used:

| Example | Potting Material |
| --- | --- |
| 4 | polyurethane based on diphenylmethane 4,4'-diisocyanate and glycerol initiated polypropylene glycol (molecular weight about 3000) and containing about 23% calcium carbonate filler. |
| 5 | As Example 4 but foamed by agitating in air to reduce the density from 1.23 to 1.12 gcm$^{-3}$. |
| 6 | As Example 1. |
| 7 | polyurethane based on isocyanate terminated polytetrahydrofuran based urethane prepolymer of peak molecular weight about 12000 and a mixture of 4,4'-diaminophenylmethane and isomers in dioctyl phthalate. |
| 8 | As Example 1 but including a large proportion of expanded polystyrene bead (1–2 mm diameter). |
| 9 | Polysulphide based on polysulphide having terminal thiol groups (molecular) weight about 1000), plasticiser, titanium dioxide and calcium carbonate fillers, and manganese dioxide curing agent in plasticiser. |
| 10 (comparative) | Room temperature polyamide cured two-part epoxy. |

The potting materials and the potted support members had the properties shown in Table V and the properties of the hydrophones are shown in Table VI.

TABLE V

| Example | Potting Material | Void Content (%) | Bulk Modulus (2) Kp (MPa) | Glass Transition Temperature (°C.) @ 100 Hz | 2 Kp + ET/R (1) (GPa) | ET/KpR (1) |
| --- | --- | --- | --- | --- | --- | --- |
| 4 | polyurethane | 5.5 | 23.45 | −27 | 0.073 | 1.113 |
| 5 | foamed polyurethane | 8.6 | 14.65 | −25 | 0.0554 | 1.78 |
| 6 | silicone | 6.4 | 14.45 | −45 | 0.055 | 1.81 |
| 7 | polyurethane | 5.7 | 111.9 | −34 to −5 | 0.250 | 0.23 |
| 8 | silicone + polystyrene | — | — | — | — | — |
| 9 | polysulphide | 4.1 | 15.16 | −23 | 0.056 | 1.72 |

TABLE V-continued

| Example | Potting Material | Void Content (%) | Bulk Modulus (2) Kp (MPa) | Glass Transition Temperature (°C.) @ 100 Hz | 2 Kp + ET/R (1) (GPa) | ET/KpR (1) |
|---|---|---|---|---|---|---|
| 10 | epoxy | 10.1 | 1480 | +45 | 2.99 | 0.0176 |

Notes
(1) Circumferential Young's modulus of the support member (E) was 480 MPa
(2) Modulus values were determined at 1 Hz and 20° C.

TABLE VI

| Example | Potting Material | Sensitivity dB/V/uPa | Standard Deviation | Frequency Response (dB/octave) | Pressure Response (dB/bar) |
|---|---|---|---|---|---|
| 4 | polyurethane | −195 | 0.56 | 0.16 | 0.73 |
| 5 | foamed polyurethane | −186.2 | 0.12 | 0.03 | 0.18 |
| 6 | silicone | −187.5 | 0.27 | 0.1 | 1.8 |
| 7 | polyurethane | −194.4 | 0.54 | 0.37 | 0.4 |
| 8 | silicone + polystyrene | −184.6 | 0.11 | 0.08 | 0.16 |
| 9 | polysulphide | −186.8 | 0.27 | 0.2 | 0.24 |
| 10 | epoxy | −214.0 (1) | 0.81 | 1.02 (1) | 0.64 |

Note:
(1) at 30 Hz

From the table it can be seen that the hydrophones in which the potting material had been foamed or had had foamed materials incorporated therein exhibited the greatest sensitivity, the lowest frequency response and the lowest pressure sensitivity. The greatest frequency response was shown by Example 7 which is believed to be due to the relatively high glass transition temperature of the potting material at frequencies of 100 Hz and above.

We claim:

1. A pressure sensing transducer which comprises a central region around which is formed a helix of piezoelectric coaxial cable that will generate electrical signals in response to external pressure variations, and a barrier that suppresses transmission of external pressure variation to the central region, the barrier being formed at least partly by the helix of coaxial cable, and the central region having a sufficiently low radial stiffness to allow radial contraction of the helix in response to external pressure variations such that the electrical signals generated by the coaxial cable have a $d_{31}$ polarity.

2. A transducer as claimed in claim 1, wherein the piezoelectric coaxial cable has a dielectric formed from a polymeric material.

3. A transducer as claimed in claim 2, wherein the dielectric comprises a vinylidine fluoride polymer.

4. A transducer as claimed in claim 3, wherein the dielectric comprises polyvinylidine fluoride.

5. A transducer as claimed in claim 1, wherein the radial stiffness of the barrier is provided principally by the coaxial cable.

6. A transducer as claimed in claim 1, wherein the barrier is formed from one or more materials other than the coaxial cable, the or each of which has a tensile modulus in the direction of the circumference of the helix, that is lower than that of the coaxial cable dielectric.

7. A transducer as claimed in claim 1, which includes a flexible hollow tube that encloses the helix.

8. A transducer as claimed in claim 7, wherein the hollow tube was dimensionally heat-recoverable in its previous configuration and was recovered about the helix by application of heat.

9. A transducer as claimed in claim 7, wherein the flexible tube has a wall thickness in the range of from 0.1 to 1 mm.

10. A transducer as claimed in claim 7, wherein the flexible tube forms part of the barrier.

11. A transducer as claimed in claim 1, wherein the helix is located around a hollow, radially compressible, support member.

12. A transducer as claimed in claim 1, wherein the central region comprises a potting material.

13. A transducer as claimed in claim 12, wherein the potting material is crosslinked elastomer.

14. A transducer as claimed in claim 12, wherein the potting material has been foamed or has a foamed material incorporated therein.

15. A transducer as claimed in claim 12, wherein the potting material has a tensile modulus of not more than 20 MPa at all frequencies in the range of from 0.1 to 100 Hz and at all temperatures in the range of from 0 to 20° C.

16. A transducer as claimed in claim 12, wherein the potting material has a glass transition temperature not higher than −10° C.

17. A transducer as claimed in claim 1, which is provided with an end-cap at each end thereof.

18. A transducer as claimed in claim 1, which includes one or more axial strength members which extend axially along the transducer to prevent or reduce elongation thereof.

19. A transducer as claimed in claim 18, wherein the axial strength members are located within the interior of the helix.

20. A transducer as claimed in claim 18 or claim 19, wherein the or each axial strength member is in the form of a wire having a tensile (Young's) modulus of at least 50 GPa.

21. A transducer as claimed in claim 1, wherein each winding of the coaxial cable is spaced apart from the or each adjacent winding.

22. A transducer as claimed in claim 1, wherein the helix of coaxial cable is a multi-start helix.

23. A transducer as claimed in claim 1, which has a length of at least 0.1 m.

24. A transducer as claimed in claim 23, having a length in the range of from 0.4 to 2 m.

25. A transducer as claimed in claim 1, which has an outer diameter in the range of from 6 to 20 mm.

* * * * *